United States Patent [19]
White

[11] Patent Number: 6,033,640
[45] Date of Patent: Mar. 7, 2000

[54] METHOD FOR THE REAGENTLESS REMOVAL OF NITROGEN OXIDES FROM EXHAUST STREAMS

[75] Inventor: James H. White, Boulder, Colo.

[73] Assignee: Electric Power Research Institute, Inc., Palo Alto, Calif.

[21] Appl. No.: 09/085,314

[22] Filed: May 27, 1998

[51] Int. Cl.$^7$ .............................. B01D 47/00; B01J 8/02; B01J 23/00; C01B 13/00; C01B 17/16

[52] U.S. Cl. ................. 423/210; 423/212; 423/213.2; 423/213.5; 423/219; 423/224; 423/230; 423/235; 423/239.1; 502/300; 502/311; 502/312; 502/313; 502/314; 502/315; 502/316; 502/317

[58] Field of Search ..................... 423/210, 212, 423/213.2, 213.5, 219, 224, 230, 235, 239.1; 502/300, 311, 312, 313, 314, 315, 316, 317

[56] References Cited

U.S. PATENT DOCUMENTS

| | | | |
|---|---|---|---|
| 3,914,389 | 10/1975 | Haacke | 423/263 |
| 4,102,777 | 7/1978 | Wheelock | 208/121 |
| 4,485,191 | 11/1984 | Sekido et al. | 502/303 |
| 5,108,977 | 4/1992 | Yoshita et al. | 502/304 |
| 5,208,202 | 5/1993 | Muramatsu et al. | 502/302 |
| 5,320,999 | 6/1994 | Muramatsu et al. | 502/303 |
| 5,340,548 | 8/1994 | Abe et al. | 422/177 |
| 5,474,965 | 12/1995 | Nakatsuji et al. | 502/330 |
| 5,589,432 | 12/1996 | Yoshida et al. | 502/325 |
| 5,691,263 | 11/1997 | Park et al. | 502/66 |
| 5,741,468 | 4/1998 | Saito et al. | 423/239.1 |
| 5,747,410 | 5/1998 | Muramatsu et al. | 502/348 |
| 5,830,421 | 11/1998 | Gardner et al. | 423/213.2 |
| 5,849,254 | 12/1998 | Suzuki et al. | 423/213.5 |

OTHER PUBLICATIONS

Tabata, Kenji, Decomposition of NO by $Ba_2YCu_3O_{7-\delta}$, *Journal of Materials Science Letters 7* (1988), pp. 147–148.

Mori, Toshiyuki, et al., "Influence of Oxygen Ion Conduction on Nitric Oxide Decomposition", *Journal of American Ceramic Society*, 77 (1994), pp. 2771–2772.

Shin, Shigemitsu, et al., "Catalystic Decomposition of NO Over Brownmillerite–Like Compounds, $Ca_2Fe_2O_5$ and $Sr_2Fe_2O^5$", *Mat. Res., Bull.*, vol. 14 (1979), pp. 133–136.

Li, Yuejin, et al., "Stoichiometric Catalytic Decomposition of Nitric Oxide over Cu–ZSM–5 Catalysts", *The Journal of Physical Chemistry*, vol. 94, No. 16 (Aug. 9, 1990), pp. 6145–6147.

Xie, Shuibo, et al., "Decomposition of Nitric Oxide over Barium Oxide Supported on Magnesium Oxide. 1. Catalytic Results and in Situ Raman Spectroscopic Evidence for a Barium–Nitro Intermediate", *J. Am. Chem. Soc.*, 119 (1997), pp. 10186–10191.

Zhao, Zhen, et al., "Comparative study of Nickel–based perovskite–like mixed oxide catalysts for direct decomposition of NO", *Applied Catalysis B: Environmental* 8 (1996), pp. 281–297.

*Primary Examiner*—Gary P. Straub
*Assistant Examiner*—Cam N. Nguyen
*Attorney, Agent, or Firm*—Flehr Hohbach Test Albritton & Herbert, LLP

[57] ABSTRACT

The method for the reagentless removal of nitrogen oxides from oxygen rich exhaust streams which includes impinging the exhaust gases upon a catalyst which includes a Lewis base metal cation, bismuth oxide and a mixture of transition metal cations.

6 Claims, No Drawings

METHOD FOR THE REAGENTLESS REMOVAL OF NITROGEN OXIDES FROM EXHAUST STREAMS

BRIEF DESCRIPTION OF THE INVENTION

This invention relates generally to the catalytic removal of nitrogen oxides from exhaust streams, and more particularly to the direct conversion of nitrogen oxides without the need of a reagent employing a catalyst including a mixture of Lewis base cations and transition metal cations.

BACKGROUND OF THE INVENTION

The removal of oxides of nitrogen from oxygen rich streams is currently performed at a commercial level in utility boiler exhausts using selective catalytic reduction (SCR). In this process, an exhaust stream is passed over a catalyst, along with a reductant (ammonia). Through a chemical reaction in which ammonia reduces nitrogen oxides ($NO_x$) adsorbed onto the catalyst surface, the latter species ($NO_x$) are removed from the exhaust stream. The process thus requires the availability of an on-site source of ammonia or other reductant. This adds capital cost in the form of an ammonia plant, as well as costs for fixturing and plumbing. The expense of operating such facilities must also be added to normal operating cost.

Conditions encountered by the catalyst(s) can be summarized as follows: temperature of 150–400° C., oxygen content of 3–5%, NO content of 100–500 ppm for coal and 50–150 ppm for natural gas fired boilers, $SO_2$ levels of 400–3000 ppm in exhausts of coal fired systems and negligible levels from natural gas fired boilers. Additionally, $CO_2$ (10–20%) and $H_2O$ (10–20%) are invariably present in exhaust streams. The exhaust streams will also typically contain incompletely oxidized species such as carbon monoxide, unburned hydrocarbon, or carbon particulates which, with the catalysts of the present invention, can be used to effect greater conversion of nitrogen oxides. Consequently, catalysts must be designed that will accommodate the presence of both this incidental reductant and excess oxygen. The use of reductants (ammonia) in addition to those from fuel is undesirable because of increased storage and operating cost and the opportunity for slip (emission of reductant). Additional concerns arise from the effect of fuel bound poisons such as sulfur dioxide, water, and carbon dioxide on the activity of a catalyst. High concentrations of water may chemically destabilize materials, thereby resulting in another pathway for catalyst deactivation. Fly ash can coat catalysts and introduce metallic poisons onto the surface of the catalysts.

The problem posed by catalytic $deNO_x$ in oxygen rich streams is that the catalyst is poisoned by adsorbed oxygen, which is typically present in concentrations from one to three orders of magnitude higher than that of the nitrogen oxides, resulting in a mass action effect (i.e. the extent of catalyst surface coverage by oxygen increases with gas stream oxygen content). The problem with oxide forming metals is that the metal surface rapidly forms a thin layer of adsorbed oxygen or metal oxide, blocking access to the surface of the molecule targeted for removal.

The direct catalytic conversion of the nitric oxide without a reducing agent has been previously investigated. Tabata (Kenji Tabata, Journal of Materials Science Letters, 7, 147(1988)) reported on the activity of the material $Ba_2YCu_3O_{7-\delta}$. It was found that the material could remove approximately 18% of a stream 51 ppm in NO and 8.1% in oxygen at approximately 300° C. and 15,500 $h^{-1}$.

Similar to the material reported by Tabata are the catalysts reported by Mori, et al, Toshiyuki Mori, Hiroshi Yamamura, Hiroyuki Ogino, Hidehiko Kobayashi, and Takashi Mitamura, Journal of the American Ceramic Society, 77, 2771(1994). The materials $Ba_2In_2O_5$, $Ba_3Y_4O_9$, and $BaLa_2O_4$, which possess the brownmillerite structure, demonstrated $deNO_x$ activities which increased with a decreased temperature of orderd-disorder transition. In the absence of added oxygen, up to 45% of 1300 ppm NO was removed at 500° C. and a space velocity of 2500 $h^{-1}$. The authors indicated that these materials are sensitive to water, becoming less active in its presence.

Shin, et al. (Shigemitsu Shin, Yuko Hatakeyama, Kiyoshi Ogawa, and Kin'ya Shimomura, Materials Research Bulletin, 14, 133(1979)) evaluated the materials $Ca_2Fe_2O_5$ and $Sr_2Fe_2O_5$ for activity toward direct decomposition of $NO_x$. The material $Ca_2Fe_2O_5$ was inactive, but $Sr_2Fe_2O_5$ demonstrated activity for the decomposition of 3% NO in helium. Essentially 100% of NO was decomposed at 900° C. but only 300 $h^{-1}$. Neither of these conditions suggest possible employment in utility applications.

Li and Hall (Yuejin Lin and W. Keith Hall, Journal of Physical Chemistry, 94, 6145 (1990)) reported on the activity of the zeolite catalyst Cu-ZSM-5 under conditions absent reagent (e.g., hydrocarbon). However, experiments were performed at impractically high levels of NO (4%) and absent oxygen. At very low space velocities (1800 $h^{-1}$), the catalyst converted over 90% of the NO in the gas stream at 500° C. The addition of 10% $O_2$ to the reaction stream resulted in a decrease in NO conversion from 97% to 80%, pointing to some oxygen poisoning.

Another catalytic approach to decomposing nitrogen oxides is that of Lunsford, et al. (Shuibo Xie, Gerhard Mestl, Michael P. Rosynek, and Jack H. Lunsford, Journal of the American Chemical Society, 119, 10186 (1997)). In this case, MgO supported BaO was the catalyst. The material was found to exhibit a maximum in the decomposition of 1% NO, absent oxygen, at 630° C. The addition of 0.5% oxygen to the gas stream resulted in almost complete loss of activity at that temperature. However, most of the activity was recovered when the temperature was increased to 660° C. When only 1.2% $CO_2$ was added to the gas stream, the catalyst's activity was decreased by almost a factor of ten.

In an article due to Wu, et al. (Zhen Zhao, Xiangguang Yang, and Yue Wo, Applied Catalysis B: Environmental, 8), the perovskite materials $LaNiO_3$, $La_{0.1}Sr_{0.9}NiO_3$, $La_2NiO_4$, and $LaSrNiO_4$ were evaluated for NO uptake, temperatures of desorption, and activity toward NO decomposition. It was found that catalyst activity increased with increasing Sr content, indicating that catalyst activity was proportional to the concentration of oxygen ion vacancies in the catalyst. The most active of these catalysts achieved its maximum activity (95% NO conversion) at 900° C., a far greater temperature than the maxima of the specific examples of the present invention which show maximum activity restricts the materials reported by Wu from finding use in post-combustion environments such as utility boiler exhausts.

The catalysts of the present invention possess a number of attributes which distinguish them from the prior art and which provide them with distinct advantages over the prior art.

First, the materials of the present invention function with practical activity under conditions with large excesses of oxygen present, and without the intentional addition of a reagent (ammonia, urea, or hydrocarbon). This cannot be said of any of the prior art. This feature promises to make the catalysts of this invention much more economical than state-of-the-art materials, and to permit application in the mitigation of $NO_x$ in the exhaust streams of utility boilers.

Second, the materials are easily synthesized and loaded onto supports in a variety of ways. This is particularly important when comparing the catalysts to zeolite materials. In the latter case, the material must be hydrothermally synthesized, i.e., from aqueous solutions under conditions of elevated temperature and pressure. This imposes severe constraints on the use of these materials in exhaust emissions where operation with minimum pressure drop is critical, since the fabrication of zeolite coated monoliths may be prohibitively expensive. For example, the use of catalyst pellets or powders in the exhausts of gas turbine engines may not be feasible. This discussion of zeolites immediately prompts the third distinguishing feature of the materials; their hydrothermal stability. Zeolites, being prepared from aqueous solutions under conditions of high temperature and pressure, also tend to be unstable under conditions in which the catalyst is steamed at high temperature. This is not true of the catalysts of the present invention.

A fourth feature of the present catalysts is their tolerance toward major gas stream constituents such as carbon dioxide and water. While simple base catalysts such as that of Lunsford, et al. demonstrate some direct decomposition activity, they are rapidly poisoned in the presence of species such as carbon dioxide, losing much of their initial activity. The present catalysts do not exhibit such intolerance.

The fifth feature of the present catalysts is the ability to obtain them in specific compositional forms incorporating catalyst functions of basicity, structurally stabilizing Lewis acid cations, and active transition-metal cations which give rise to the desirable properties of the catalysts. Thus, while Shin, et al. and Mori, et al. report brownmillerite materials, none of these materials possess practical activity or poison tolerance. It is the capability of manipulating composition and structure toward utility in practical applications that is a significant property of the materials of the present invention, not the specific nature.

OBJECT AND SUMMARY OF THE INVENTION

It is a general object of the present invention to provide a catalyst for the direct conversion of $NO_x$.

It is another object of the present invention to provide a catalyst for the direct conversion of $NO_x$ which is not poisoned in the presence of water vapor, oxygen or sulfur dioxide.

It is a further object of the present invention to provide a catalyst for the direct conversion of $NO_x$ from oxygen containing streams as found in utility boilers.

There is provided method of reagentless removal of nitrogen oxides from exhaust streams employing a catalyst which contains a Lewis base cation, bismuth oxide and a mixture of transition metal cations.

DETAILED DESCRIPTION OF THE INVENTION

The catalyst materials of the present invention contain a Lewis base metal cation, bismuth oxide, and a mixture of transition metal cations. The purpose of each of these components is as follows: The Lewis base cation provides basic sites onto which NO or $NO_2$ can adsorb. It may also destabilize the adsorbed molecule towards dissociation. The bismuth provides, in concert with the Lewis base, overall structure and structural stability to the material. Transition metal cations are included to provide two functions: 1) oxidation of NO to $NO_2$, which is more reactive (less stable towards decomposition) than NO and 2) decomposition of adsorbed intermediates. The mechanism involved in the decomposition of nitrogen oxides can thus be summarized as follows. A molecule of NO adsorbs onto a transition metal site and is oxidized to $NO_2$ which subsequently migrates onto a basic site. This oxidized, reactive species interacts with NO or $NO_2$ to produce $N_2$ plus $O_2$. Alternatively, NO or $NO_2$ adsorbs on a basic site and undergoes interaction with another molecule to produce $N_2$ and $O_2$. The former scenario is more likely, as the catalytic activity of the materials actually increases with oxygen content, suggesting the oxidation of NO as a rate limiting step. Irrespective of mechanism, the materials of the present invention exhibit behavior unlike that of any other material reported to date. Namely, their activity towards decomposing nitrogen oxides increases with oxygen content.

The acid component of the catalyst actually serves another purpose besides structurally stabilizing the material: this cation partially neutralizes the base cation species, providing tolerance to gas phase Lewis acids besides nitrogen oxides, such as carbon dioxide, water, or sulfur dioxides. Consequently, the material does not lose activity nearly as rapidly and severely as a purely basic catalyst when it is exposed to the gas phase acids.

The catalysts of this invention possess stoichiometries from $(BiO_{1.5})_{1-x-y-z}/(B_nO)_x/(M^1O)_y/(M^2O)_z$, where B=a basic cation chosen from $Ba^{2+}$ or $Sr^{2+}$ (n=1) or from the alkali metal cations (n=2: $Li^+$, $Na^+$, $K^+$, $Rb^+$, or $Cs^+$); $M^1$=a transition metal cation of Co, Fe, or Ni; and $M^2$=a transition metal cation of Cu, V, Nb, or W. The ranges of the subscripts are as follows: $0<x<0.8$, $0<y<0.5$, and $0<z<0.5$.

The catalyst material may be prepared by calcining a mixture of the constituent metal oxides and/or carbonates, oxalates, or hydroxides; by coating, drying, and thermally decomposing metal nitrates, acetates, acetylacetonates, or lactates on metal oxide or metal supports.

In actual use, the catalysts of the present invention would be incorporated onto any of a variety of supporting structures. Most likely, stainless steel, monel, Inconel, or other common alloys or a ceramic material such as cordierite would be employed in this capacity. A monolith (in the case of a ceramic support) or a wire mesh structure (in the case of a metal support) would be utilized. The catalyst would be deposited onto the support by dipping in a solution containing the appropriate metal ions or by spraying a solution of the metal ions onto a support gently heated to the temperature of vaporization of the solvent (e.g. water). The support, now coated with a film of catalyst precursor, could be fired in a dedicated furnace to decompose catalyst precursor into the active catalyst. Also, the monolith or wire mesh could be placed in the position of normal use and the catalyst precursor decomposed in situ.

Placement of the supported catalyst in the exhaust stream would depend on the anticipated temperature of operation. For example, at an operating temperature of 350° C., employment in utility boiler flues would demand catalyst placement not far downstream of the cold side of the heat exchanger.

The present invention will be further described in the following examples, but the invention should not be construed as being limited thereto.

EXAMPLE 1

The first specific example of the invention is provided by the material $BiBaCo_{0.5}Cu_{0.5}O_{3.5}$. 5.11 g of $Bi_2O_3$, 4.33 g of $BaCO_3$, 0.88 g of $Co_3O_4$, and 0.87 g of CuO were placed into a plastic screw capped bottle along with alumina grinding media and isopropanol and ball milled for 65 hours. After ball milling, the isopropanol was evaporated with a heat lamp and the resulting powder calcined at 400° C. for 4 hours. The powder was ground with a mortar and pestle. The x-ray diffraction pattern was characteristic of a mixture of partially reacted metal oxides. An experiment was performed in which a mixture of 950 ppm NO and 16% $O_2$ in helium was passed over the catalyst at 350° C. and 12,000 $h^{-1}$. After 66 hours on-line, the catalyst was found to remove 60% of the nitrogen oxide in the stream, with the predominant product being nitrogen.

EXAMPLE 2

The second specific example, a version of the material $BiBaCo_{0.5}Cu_{0.5}O_{3.5}$ in the first specific example was also prepared by coprecipitation. 19.40 g of $Bi(NO_3)_3$, 10.44 g of $Ba(NO_3)_2$, 5.80 g $Co(NO_3)_2$, and 4.67 g of $Cu(NO_3)_2$ were dissolved at 65° C. in 100 ml of deionized water acidified by the addition of 9 ml of concentrated nitric acid. 40 ml of 5 M potassium carbonate solution was then pipetted into this acidified aqueous mixture resulting in a blue precipitate. The precipitate was then filtered and dried at 110° C. The dried precipitate was calcined at 400° C. for 4 hours. Finally, the powder was ground with a mortar and pestle. The x-ray diffraction pattern revealed that the material was multiphasic.

EXAMPLE 3

Another example of the invention is provided by the material $BiBaCuO_3$ prepared from the oxides. 5.085 g of $Bi_2O_3$, 4.312 g of $BaCO_3$, and 1.737 g of CuO were placed into a plastic screw capped bottle along with alumina grinding media and isopropanol and ball milled for 65 hours. After ball milling, the isopropanol was evaporated with a heat lamp and the resulting powder calcined at 400° C. for 4 hours. The powder was ground with a mortar and pestle. The x-ray diffraction pattern was characteristic of a mixture of partially reacted metal oxides. Exposing the catalyst to a mixture of gases 500 ppm in NO and 3 volume % $O_2$ with a balance of helium resulted in removal of up to 66% of the NO at 10,000 $h^{-1}$ and 350° C., with activity persisting for at least 190 hours.

EXAMPLE 4

The material $BiBaCuO_3$ was also prepared from the oxides by high temperature calcination of the constituent metal oxides and carbonates. In this case, 5.090 g of $Bi_2O_3$, 4.311 g of $BaCO_3$, and 1.739 g of CuO were placed into a plastic screw capped bottle along with alumina grinding media and isopropanol and ball milled for 24 hours. After ball milling, the isopropanol was evaporated with a heat lamp and the resulting powder calcined at 800° C. for 2 hours. The powder was ground with a mortar and pestle. The x-ray diffraction pattern was still characteristic of a mixture of partially reacted metal oxides, although the pattern demonstrated more extensive reaction and resembled that for a perovskite more so than did Example 3. Exposing the catalyst to a mixture of gases 500 ppm in NO and 3 volume % $O_2$ with a balance of helium resulted in removal of up to 46% of the NO at 10,000 $h^{-1}$ and 350° C.

EXAMPLE 5

The material $Sr_2Bi_2Cu_2O_7$ was prepared from the metal oxides and carbonates as follows. 3.547 g $SrCO_3$, 5.599 g $Bi_2O_3$, and 1.913 g of CuO were ball milled with alumina grinding media in an isopropanol slurry for 24 hours. The isopropanol was evaporated and the powder calcined at 800° C. for 2 hours. An x-ray diffraction pattern, characteristic of reacted components and a largely single phase material was obtained. Passing over the catalyst a mixture of gases, containing 500 ppm NO, 3% $O_2$, and a balance of helium at 10,000 $h^{-1}$ and 350° C. resulted in removal of up to 45% of the NO. Activity persisted for at least 95 hours.

EXAMPLE 6

The material $Bi_{1.33}Ba_{0.67}Co_{0.5}Cu^{0.5}O_3$ supported on alumina was prepared by decomposition of the nitrates using the following procedure. 3.23 $Bi(NO)_3$, 0.88 g $Ba(NO_3)_2$, 0.73 g $Co(NO_3)_2$, and 0.58 g $Cu(NO_3)_2$ were dissolved in 25 ml of deionized water acidified with $HNO_3$ by stirring at 60° C. 5 ml of this solution was added to 6.00 g of neutral Brockmann I alumina to form a thick slurry. Excess water was evaporated and the solid was calcined at 400° C. for 4 hours to give a weight loading of 6.7%. The catalyst was evaluated by passing a gas mixture of 539 ppm NO and 4% $O_2$ in helium over the catalyst at 25,000 $h^{-1}$ and 350° C. Approximately 14% of the NO was removed under these conditions.

EXAMPLE 7

The material $BaBi_{0.5}Cu_{0.5}O_3$ was synthesized from the oxides in the following manner. 6.138 g $BaCO_3$, 3.618 g $Bi_2O_3$, and 1.237 g CuO were ball milled with alumina grinding media in an isopropanol slurry for 24 hours. An x-ray diffraction pattern, characteristic of reacted components and one predominant single phase material was obtained. The catalyst was tested by passing over it, at 10,000 $h^{-1}$ and 350° C., a gas mixture that contained 560 ppm NO, 3% $O_2$, and the balance helium. Up to 33% removal of NO was obtained.

Thus there has been provided a catalyst in the reagentless removal of nitrogen oxides from exhaust systems. The catalyst is easy to manufacture and contains a Lewis base cation, bismuth oxide and a mixture of transition metals.

While the invention has been described in detail and with reference to specific examples, it will be apparent to one skilled in the art that catalyst having various compositional structures can be made without departing from the spirit and scope of the present invention.

What is claimed:

1. The method of catalytically removing nitrogen oxides from oxygen rich exhaust streams by direct conversion of the nitrogen oxides to nitrogen and oxygen comprising the steps of selecting a catalyst represented by the following stoichiometries

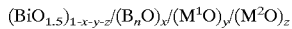

where B=a basic cation chosen from $Ba^{2+}$ or $Sr^{2+}$ (n=1) or from the alkali metal cations (n=2: $Li^+$, $Na^+$, $K^+$, $Rb^+$, or $Cs^+$); $M^1$=a transition metal cation of Co, Fe, or Ni; and $M^2$=a transition metal cation of Cu, V, Nb, or W, where the ranges of the subscripts are as follows: $0<x<0.8$, $0<y<0.5$, and $0<z<0.5$, and $x+y+z<1$, supporting the catalyst on a support structure in the path of the exhaust stream, and causing the exhaust stream to impinge upon the catalyst where the Lewis base cations provide sites for absorption of the nitrogen oxide molecules and the transition metal cations oxidize the nitrogen oxide molecules so that they can interact in the presence of oxygen to provide $N_2$ and $O_2$.

2. The method of claim 1 in which the selected catalyst is $BiBaCo_{0.5}Cu_{0.5}O_{3.5}$.

3. The method of claim 1 in which the selected catalyst is $BiBaCuO_3$.

4. The method of claim 1 in which the selected catalyst is $SrBi_2Cu_2O_7$.

5. The method of claim 1 in which the selected catalyst is $Bi_{1.33}Ba_{0.67}Co_{0.5}O_3$.

6. The method of claim 1 in which the selected catalyst is $BaBi_{0.5}Cu_{0.5}O_3$.

* * * * *